United States Patent
Mohassel et al.

(10) Patent No.: US 11,368,308 B2
(45) Date of Patent: Jun. 21, 2022

(54) PRIVACY PRESERVING BIOMETRIC AUTHENTICATION

(71) Applicant: VISA INTERNATIONAL SERVICE ASSOCIATION, San Francisco, CA (US)

(72) Inventors: Payman Mohassel, San Jose, CA (US); Shashank Agrawal, Sunnyvale, CA (US); Pratyay Mukherjee, Santa Clara, CA (US); Saikrishna Badrinarayanan, Los Angeles, CA (US)

(73) Assignee: Visa International Service Association, San Francisco, CA (US)

( * ) Notice: Subject to any disclaimer, the term of this patent is extended or adjusted under 35 U.S.C. 154(b) by 149 days.

(21) Appl. No.: 16/738,978

(22) Filed: Jan. 9, 2020

(65) Prior Publication Data

US 2020/0228341 A1 Jul. 16, 2020

Related U.S. Application Data

(60) Provisional application No. 62/791,598, filed on Jan. 11, 2019.

(51) Int. Cl.
*H04L 9/08* (2006.01)
*H04L 9/30* (2006.01)
(Continued)

(52) U.S. Cl.
CPC .......... *H04L 9/3231* (2013.01); *H04L 9/0869* (2013.01); *H04L 9/30* (2013.01); *G06Q 50/265* (2013.01)

(58) Field of Classification Search
CPC ....... H04L 9/3231; H04L 9/0869; H04L 9/30; G06Q 50/265
See application file for complete search history.

(56) References Cited

U.S. PATENT DOCUMENTS 6,819,219 B1 * 11/2004 Bolle .............. G06Q 20/40145
340/5.82
2004/0091136 A1 * 5/2004 Dombrowski ......... G07C 9/257
382/115

(Continued)

FOREIGN PATENT DOCUMENTS

WO 2019032301 A1 2/2019

OTHER PUBLICATIONS

Mengxing Li, Quan Feng, Jian Zhao, Mei Yang, Lijuan Kang and Lili Wu, Minute Matching With Privacy Protection Based on the combination of Garbled Circuit and Homomorphic Encryption, 2014 (Year: 2014).*

(Continued)

*Primary Examiner* — Darshan I Dhruv
(74) *Attorney, Agent, or Firm* — Kilpatrick Townsend & Stockton LLP

(57) ABSTRACT

Techniques of authenticating a first device of a user to a second device are disclosed. The method enables the second device to perform authentication using a biometric template stored on the first device and a biometric measurement. Homomorphic encryption may be used by the first device to encrypt the biometric template and the second device to determine an encrypted similarity metric between the biometric template and the biometric measurement. The second device can also determine an encrypted code using an authentication function and the encrypted similarity metric. The second device sends the encrypted code and the encrypted similarity metric to be decrypted by the first device. The second device can receive a response from the first device, indicating whether a decrypted similarity metric exceeds a threshold; and whether the decrypted code matches a test code. The second device can then authenticate the user based on the response.

20 Claims, 8 Drawing Sheets

(51) Int. Cl.
  *H04L 9/32*  (2006.01)
  *G06F 21/00*  (2013.01)
  *G06Q 50/26*  (2012.01)

(56) References Cited

U.S. PATENT DOCUMENTS

| | | | | |
|---|---|---|---|---|
| 2007/0098224 | A1* | 5/2007 | Morita | G06F 21/608 340/5.2 |
| 2007/0180261 | A1 | 8/2007 | Akkermans et al. | |
| 2007/0226512 | A1* | 9/2007 | Kevenaar | G06F 21/32 713/186 |
| 2009/0006855 | A1* | 1/2009 | Tuyls | H04L 9/3218 713/182 |
| 2012/0131350 | A1* | 5/2012 | Atherton | H04L 63/061 713/186 |
| 2012/0207299 | A1* | 8/2012 | Hattori | H04L 9/3073 380/30 |
| 2013/0318351 | A1 | 11/2013 | Hirano et al. | |
| 2014/0047529 | A1* | 2/2014 | Pizano | G06F 21/32 726/7 |
| 2014/0115324 | A1* | 4/2014 | Buer | H04L 9/0861 713/155 |
| 2015/0019944 | A1* | 1/2015 | Kalgi | G06Q 20/3552 715/205 |
| 2015/0073997 | A1* | 3/2015 | Berardi | G06Q 20/4012 705/72 |
| 2016/0119119 | A1* | 4/2016 | Calapodescu | G06F 21/6227 380/30 |
| 2016/0182226 | A1* | 6/2016 | Yasuda | H04L 9/3231 380/28 |
| 2018/0294965 | A1* | 10/2018 | Yan | H04L 9/006 |
| 2019/0280868 | A1* | 9/2019 | Streit | G06F 21/32 |
| 2019/0280869 | A1* | 9/2019 | Streit | H04L 9/008 |
| 2020/0050794 | A1* | 2/2020 | Hassan | H04L 63/08 |
| 2020/0228339 | A1* | 7/2020 | Barham | H04L 9/3218 |

OTHER PUBLICATIONS

Zhou, et al., "PassBio: Privacy-Preserving User-Centric Biometric Authentication", arXiv:1711.04902v1[cs.CR], Nov. 14, 2017, 29 pages.

Lee, et al., "Instant Privacy-Preserving Biometric Authentication for Hamming Distance", Seoul National University, University of San Diego, and Software R&D Center, Samsung Electronics, South Korea, 28 pages.

* cited by examiner

PRIVACY PRESERVING BIOMETRIC AUTHENTICATION

CROSS-REFERENCES TO RELATED APPLICATIONS

This application claims priority to provisional patent application 62/791,598, filed on Jan. 11, 2019, which is herein incorporated by reference in its entirety for all purposes.

BACKGROUND

Biometrics are hard to steal and hard to falsify, so they can be more secure than a password or PIN. However, biometrics are also more sensitive in that they are essentially impossible to replace if somehow stolen or compromised. Therefore, ensuring a high level of security of biometric information may be desirable.

A device may have some resource protected with a biometric such as access to a local or remote device, an account, or a secure building. When a user wants to access the protected resource, they input a biometric measurement to the device. The user may have previously input their biometric measurement to the device, creating a biometric template. The device may have then stored the template. If the biometric measurement matches the stored template to within a predetermined threshold, then the user is granted access to the protected resource.

As biometrics become more popular as an authentication method, they are used in a wider range of situations. They can be used in low trust situations, such as situations involving publically accessible and/or unsecured devices. If the biometric template is leaked to a malicious party, then that could compromise the security of the user.

Thus there is need for a way to use biometric authentication while maintaining privacy.

BRIEF SUMMARY

Embodiments can provide techniques for authenticating a first electronic device of a user to a second electronic device. The authentication can use a biometric template stored on the first device of the user, while enabling the second device to perform the authentication using a biometric measurement. Homomorphic encryption may be used by the first device to encrypt the biometric template and used by the second device to determine an encrypted similarity metric between the biometric template and the biometric measurement. In some embodiments, the second device can also determine an encrypted code using a public key of the first device, an authentication function, and the encrypted similarity metric, e.g., for use later to verify a response from the first device. The second device may send the encrypted code and the encrypted similarity metric to be decrypted by the first device.

In some embodiments, the second device can receive the decrypted similarity metric and decrypted code and verify that the decrypted code matches a newly generated test code using the decrypted similarity metric, e.g., to confirm that the values provided by the first device are accurate. Further, the second device can confirm that the decrypted similarity metric exceeds a threshold, indicating that the biometric measurement is a match for the biometric template, thereby authenticating the user.

In other embodiments, a zero-knowledge proof may be further used to prevent the second device from receiving the decrypted similarity metric. Homomorphic encryption may be used by the first device to encrypt the biometric template and used by the second device to determine an encrypted similarity metric between the biometric template and the biometric measurement. The encrypted similarity metric may be masked by a random value selected by the first device. The second device can also determine an encrypted code using a public key of the first device, an authentication function, and the encrypted similarity metric, e.g., for use later to verify a response from the first device. The second device may send the encrypted code and the encrypted similarity metric to be decrypted by the first device.

In some embodiments, the first device may use the decrypted similarity metric to create a zero-knowledge proof. The decrypted similarity metric may be masked. With the zero-knowledge proof, the first device may assert to the second device that the decrypted similarity metric exceeds a threshold. The second device can receive the masked decrypted similarity metric and decrypted code and verify that the decrypted code matches a newly generated test code using the decrypted similarity metric, e.g., to confirm that the values provided by the first device are accurate. Further, the second device can evaluate the zero-knowledge proof and confirm that the decrypted similarity metric exceeds a threshold, indicating that the biometric measurement is a match for the biometric template, thereby authenticating the user.

In another embodiment, a garbled circuit can be used to perform the authentication. The garbled circuit may prevent both the first device and the second device from learning the decrypted similarity metric. Homomorphic encryption may be used by the first device to encrypt the biometric template and used by the second device to determine an encrypted similarity metric between the biometric template and the biometric measurement. The second device may mask the encrypted similarity metric with a random value. The second device can also determine an encrypted code using a public key of the first device, an authentication function, and the encrypted similarity metric, e.g., for use later to verify a response from the first device. The second device may send the encrypted code and the encrypted similarity metric to be decrypted by the first device.

In some embodiments, the second device may then generate a garbled circuit that is configured to compute whether the decrypted similarity metric exceeds a threshold. The garbled circuit may also be configured to generate a test code using the decrypted similarity metric and verify that the test code matches the decrypted code, e.g., to confirm that the values provided by the first device are accurate. The second device may send the garbled circuit to the first device. The first device may evaluate the garbled circuit and send the output to the second device, thereby authenticating the user.

In another embodiment, a system is presented for securely authenticating a user on an second device with a biometric template stored on a first device.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

TERMS

Figure 1A:
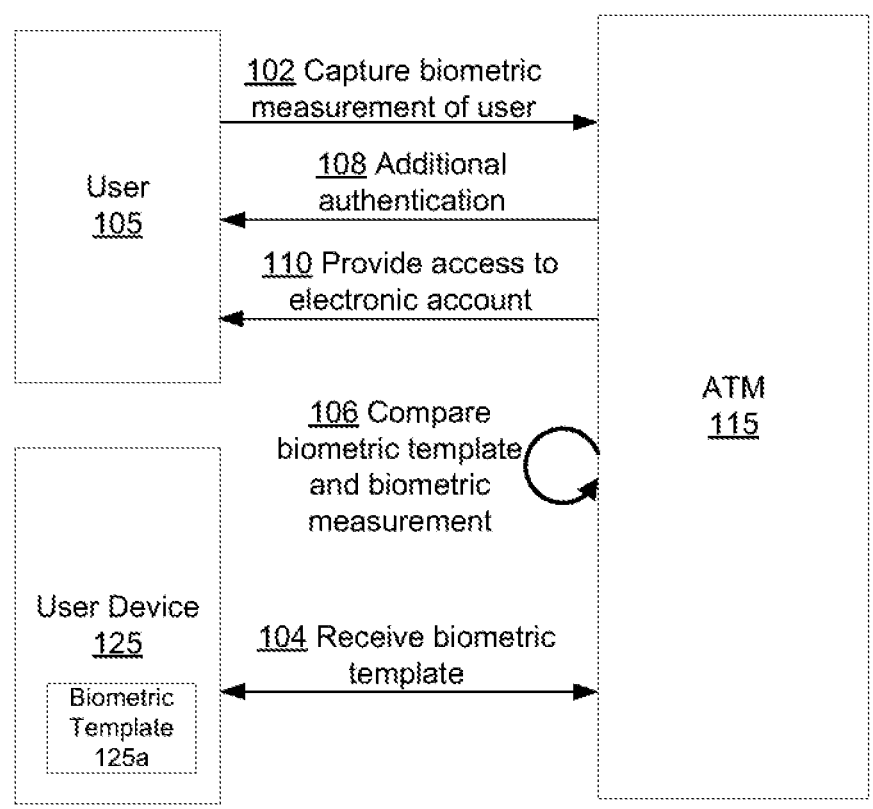
FIG. 1A shows processes for accessing an automated teller machine that may be improved using embodiments.

Prior to discussing embodiments of the invention, some terms can be described in further detail.

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

A "user device" may be any suitable device that is operated by a user. Suitable user devices can be portable and can communicate with external entities such as access devices. Examples of user devices include mobile phones, laptop computers, smartwatches, access cards, smart cards, etc.

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. AN access device may be in any suitable form. Some examples of access devices include POS or point of sale devices (e.g., POS terminals), cellular phones, PDAs, personal computers (PCs), table PCs, handheld specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. Other examples of access devices include devices (e.g., locks, gates, access control boxes, etc.,) that control physical access to locations (e.g., venues, transit stations, homes, offices, buildings, etc.,) as well as software devices that control access to data or information. In embodiments, the access device may be configured to charge or recharge a user device via contact or contactless modes of operation.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

DETAILED DESCRIPTION

Biometric authentication can be used in a variety of situations for authentication. As a user's biometric information is highly unique, it can provide strong authentication. There is also a need to ensure high levels of security for biometric information.

Biometric matching can be used in a variety of situations. Some of the most common applications are for accessing a local or remote device, e.g., authorizing a transaction by confirming ownership to an electronic file/account. For example, a user may have a biometric template (e.g., a fingerprint or facial scan) stored on a user device (e.g., a mobile phone). The user may then use the biometric to authenticate themselves and unlock the user device. If the user is using the user device to initiate a transaction, they may be required to use the biometric to authenticate themselves before completing the transaction.

Typically, biometric matching is performed by a single user device. The user device can store a biometric template obtained from an initial biometric measurement. Later, the user device can capture a new biometric measurement. The user device can then match the biometric template and the new measurement using some distance measure. However, there may be situations where the biometric template and the measurement are stored on separate devices. For example, a user may want to use their biometric data to access a shared computer or enter a secure area. Storing a biometric template on the shared computer may not be desirable as that may expose the biometric template to attack from other users of the shared device, e.g., the other user may obtain the biometric template and use it in improper ways. In another example, a user may use their biometric to authenticate a transaction made with an access device that is not their personal device, such as an access device operated by a resource provider.

In each of the above examples, in order to perform the matching with the biometric template stored on the user device, one device must send their information to the other. This makes the biometric information more susceptible to attack, either from the data being intercepted or the information being sent to a compromised device.

Embodiments of the present disclosure provide solutions for performing biometric matching between two devices that do not trust each other. In one embodiment, a method is provided for authentication with homomorphic calculation of a similarity metric. By using homomorphic encryption, the similarity metric can be calculated by an access device without revealing the plaintext value of the biometric template. In some embodiments, the plaintext similarity metric may eventually be leaked to the access device and the user device so that they may verify that the similarity metric exceeds a threshold and indicates a match.

Another embodiment of the present disclosure can make the above embodiment more secure by adding a zero-knowledge threshold proof. The zero-knowledge threshold proof allows the user device to assert that the similarity metric exceeds a threshold, without revealing the similarity metric to the terminal. Yet another embodiment of the invention uses a garbled circuit to increase security.

I. Scenarios for Using Biometrics Between Two Devices

Biometrics might be used in a variety of low trust situations, where the device capturing a biometric measurement is not the device that stores the biometric template. Such scenarios can occur in a variety of situations where it is desirable to confirm a location of the user (e.g., that the user is at a door to enter a building) as determined by an access device at that location, while also confirming that the user's device does belong to the user. Embodiments can enable such authentication to use biometrics without exposing the biometric template such that others could use it to gain improper access to the user's device or other devices.

FIG. 1A shows processes for accessing an ATM that may be improved using embodiments of the present disclosure. An ATM 115 may use biometric authentication when a user 105 attempts to access their account through the ATM.

In step 102, the ATM 115 uses a biometric capture device (such as a camera or fingerprint sensor) to capture a biometric measurement of user 105. The capture is shown as an arrow depicting the transfer of biometric information from user 105 to ATM 115. The biometric capture device could be triggered in a variety of ways. For example, the user's presence could automatically trigger the capture device. In other implementations, the user can be required to affirmatively select an button or other user interface element to trigger the capture. In this manner, instruction can be provided to the user for positioning to provide a high quality measurement.

In step 104, the ATM 115 receives a biometric template 125a from a user device 125. The user device 125 may be, for example, a mobile device such as a smart phone. The biometric template 125a may have been stored on the user device 125 from a prior enrollment step. In enrollment, the user device 125 may capture biometric information of the user 105. The user information may then be sampled and stored on the user device 125 as a biometric template. The biometric template 125a may be stored on a secure element of the user device 125. Additional information regarding enrollment may be found in section II.A. The user device 125 and the ATM 115 may communicate in a variety of ways. For example, the devices may communicate over a wireless connection such as Wi-Fi, Bluetooth, and near-field communication (NFC).

In step 106, the ATM 115 may then compare the biometric template 125a to the biometric measurement using a similarity function to compute a similarity metric. If the similarity metric exceeds a predetermined threshold, then the ATM 115 may verify the user 105. Alternatively, the ATM 115 may send the biometric measurement to the user device 125. The user device 125 may then compare the biometric template 125a to the biometric measurement using a similarity function.

In step 108, the ATM 115 may perform additional authentication and/or authorization steps. For example, the ATM 115 may request that the user 105 enter a personal identification number (PIN) or a password for further authentication. The ATM 115 may also check recent usage of the user's account as part of an authorization process. For example, a large number of withdrawals from a single account in a short period of time may indicate fraud. The ATM 115 may communicate with additional computer devices, such as an authentication computer and/or an authorization computer, to perform the additional authentication and/or authorization steps.

In step 110, once the user account is verified using the biometric technique and any authentication/authorization has been approved, the ATM 115 may notify the user 105 and allow the user 105 access to access their account. After gaining access the user 105 may be able to see account information and deposit and/or withdraw funds from the account. The level of access provided to the account may depend on the results of the authentication in step 106. For example, if the biometric measurement of the user 105 was a match but account fraud is suspected, the user may only have partial access to the account.

Sending the biometric template to the ATM may present security risks to the user. Just as malicious entities use "skimmer" devices that look like genuine card terminals to intercept identification information at ATMs, they might attempt to intercept the biometric template of the user. With a valid biometric template, fraudsters could attempt to impersonate the user and access their account. Sending the biometric measurement to the user device also creates opportunities for fraud. If the ATM does not complete the matching and verification, fraudsters may be able to manipulate the matching to wrongfully gain access to an account. A similar situation may arise when attempting to use biometric authentication at a terminal of a resource provider.

Figure 1B:
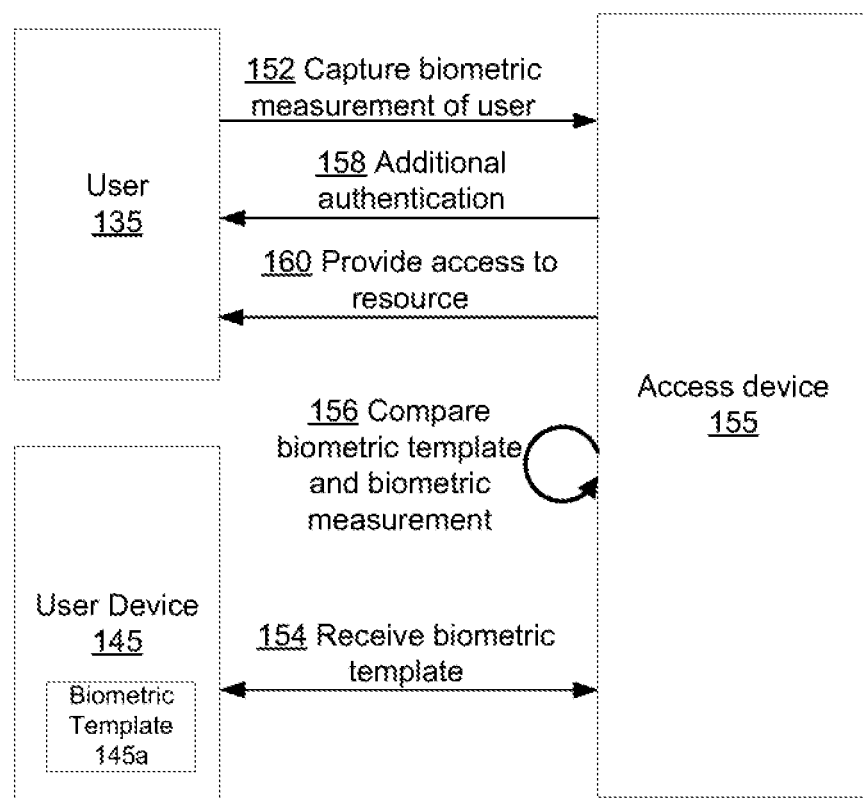
FIG. 1B shows processes for accessing a resource that may be improved using embodiments.

FIG. 1B shows processes for accessing a resource that may be improved using embodiments of the present disclosure. The processes shown in FIG. 1B may be more general versions of those shown in FIG. 1A. For example, the resource may be access to a secured building. Access to the building may be controlled by an access device 155. In some cases, the access device may store biometric templates of all users with authorization to enter the secured area. However, there may be a large number of users, and storing many biometric templates together may make the access device a target for hackers. Thus it may be beneficial to have each user store their own biometric template.

In step 152, the access device 155 may use a biometric capture device (such as a camera or fingerprint sensor) to capture a biometric measurement of the user 135. The capture is shown as an arrow depicting the transfer of biometric information from user 135 to access device 155. The biometric capture device could be triggered in a variety of ways. For example, the user's presence could automatically trigger the capture device. In other implementations, the user can be required to affirmatively select an button or other user interface element to trigger the capture. In this manner, instruction can be provided to the user for positioning to provide a high quality measurement.

In step 154, the access device 155 may receive a biometric template 145*a* from a user device 145. The user device 145 may be, for example, a mobile device such as a smart phone. The biometric template 145*a* may have been stored on the user device 145 from a prior enrollment step. In enrollment, the user device 145 may capture biometric information of the user 135. The user information may then be sampled and stored on the user device 145 as a biometric template. The biometric template 145*a* may be stored on a secure element of the user device 145. Additional information regarding enrollment may be found in section II.A. The user device 145 and the access device 155 may communicate in a variety of ways. For example, the devices may communicate over a wireless connection such as Wi-Fi, Bluetooth, and near-field communication (NFC).

In step 156, the access device 155 may then compare the biometric template 145*a* to the biometric measurement using a similarity function to compute a similarity metric. If the similarity metric exceeds a predetermined threshold, then the access device may verify the user. Alternatively, the access device 155 may send the biometric measurement to the user device 145. The user device 145 may then compare the biometric template 145*a* to the biometric measurement using a similarity function.

In step 158, the access device 155 may perform additional authentication and/or authorization steps. For example, the access device 155 may request that the user 135 enter a personal identification number (PIN) or a password for further authentication. The access device 155 may also check recent usage of an account of the user. For example, there may be recent usage that indicates potential fraud. The access device 155 may communicate with additional computer devices, such as an authentication computer and/or an authorization computer, to perform the additional authentication and/or authorization steps.

In step 160, once the user account is verified using the biometric technique and any authentication/authorization has been approved, the access device 155 may notify the user 135 and provide a resource to the user 135. In the present example, the resource may be access to the secured building. More generally, the resource may be, for example, a computer resource (e.g., stored data or a networked computer account), a physical resource (e.g., a tangible object or a physical location), or other electronic resource or communication between computers (e.g., a communication signal corresponding to an account for performing a transaction). Additional examples of a resource may include a good or service, a computer account or file, or a payment account.

This situation creates many of the same opportunities for attack and fraud as the previous use case. Embodiments of the present disclosure provide solutions for these and other deficiencies.

II. Preliminaries

Before describing embodiments of the invention, some cryptographic tools can be described. These tools can be used in embodiments. Levels of security offered by embodiments of the invention are also described.

A. Biometric Measurements and Enrollment

Examples of biometric measurements include fingerprints, palm prints, facial scans, voice prints, and iris scans. When a device captures biometric information, it collects a measurement with a lot of data. The measurement can be sampled to create a biometric template. The measurement may be sampled at particular points. For example, with a facial scan, the template may be related to data points around the eyes, nose, and mouth.

Prior to biometric authentication, a user can perform an enrollment step. In the enrollment step, a user may enter their biometric information into a user device, such as user device 145 in FIG. 1B. In some embodiments, the user device may be a mobile device such as a smartphone, a laptop computer, a smartwatch, and the like. For example, the user may use a camera of the user device to capture a facial scan, or a fingerprint sensor of the mobile device to capture a fingerprint. Once the biometric information has been entered, the user device may store it as a template, in the form of a vector, such as biometric template 145*a* in FIG. 1B. The template may be stored on a secure element of the user device. In some embodiments, the user may first access an application or website of a resource provider before entering their biometric information. This may allow the user to associate their biometric information with access to a particular resource provider. In some embodiments, the user may be prompted to periodically reenter their biometric information and update the template. This may make the template more secure.

B. Similarity Metrics

A common measure for biometrics is cosine similarity. To compute cosine similarity, the inner product of the measurement and template vectors is calculated. If the initial vectors are normalized (i.e., have length 1), then the inner product is the cosine of the angle between the two vectors. The smaller the cosine angle, and the greater the inner product, the more similar the two vectors are. Thus the similarity metric is the inner product. If the inner product is less than an established threshold, then the measurement and template are said to match.

Another similarity measure is Hamming distance. The Hamming distance of two vectors is the number of components of the vectors that do not match. For example, a vector $\vec{x}=<1, 2, 3, 4>$ and a vector $\vec{y}=<1, 2, 9, 4>$ have a Hamming distance of 1, because they differ in only one component. The similarity metric can be the number of locations where the vectors differ.

Another similarity measure is Euclidean distance. If two vectors are considered as points in space, then the Euclidean distance is the straight-line distance between the points. For example, a vector $\vec{x}=<1, 2, 3, 4>$ and a vector $\vec{y}=<1, 2, 9, 4>$ have a Euclidean distance of $\sqrt{(1-1)^2+(2-2)^2+(3-9)^2+(4-4)^2}=6$. The similarity measure can be the distance between the vectors.

Some embodiments of the present disclosure may be optimized for a particular similarity metric. For example, a protocol may be designed to make use of cosine similarity. However, embodiments may be modified to use a different similarity metric. For example, a protocol may be modified to be able to use Euclidean distance instead of cosine similarity.

C. Encryption Techniques

A variety of encryption techniques are used in embodiments of the present disclosure.

1. Homomorphic Encryption

A homomorphic encryption scheme is one in which operations done on plaintext values yield the same result as operations done on ciphertext that is later decrypted. Homomorphic encryption allows one party to perform some computation with ciphertext as an input and without knowledge of how to decrypt the information. One example of a homomorphic encryption scheme may be Paillier encryption. In additive homomorphic encryption, the homomorphic operations are addition and scalar multiplication. For example, consider two messages $M_0$ and $M_1$, encrypted as $C_0=Enc(M_0)$ and $C_1=Enc(M_1)$, and a scalar k. Then Paillier encryption may have an addition operation ADD such that the sum of the encrypted messages, $ADD(C_0,C_1)$, gives the encrypted sum of the messages, $Enc(M_0+M_1)$. There may also be a scalar multiplication operation SMULT such that the product of a scalar and an encrypted message, $SMULT(C_0,k)$, gives the encryption of the product of the scalar and the message, $Enc(M_0 \cdot k)$. Using a combination of addition and scalar multiplication, it can then be possible to calculate the inner product of an encrypted vector message and a plaintext vector message. For example, given $C_0$ and $M_1$, the encrypted inner product $Enc(IP(M_0,M_1))$ can be calculated, where $IP(M_0,M_1)$ is the inner product of the plaintext vectors.

2. Proof-of-Knowledge of Encrypted Plaintext of Particular Size

A proof-of-knowledge of encrypted plaintext of particular size can be a proof that an encrypted message encrypts a plaintext (e.g., a vector) of a particular size (e.g., length). The proof may be defined for a particular encryption scheme, such as for Paillier Encryption. If we have a message vector $\vec{M}$ encrypted as $\vec{C}=Enc(\vec{M})$, the encrypter can generate a proof $\mathcal{P}$, such that given C, $\mathcal{P}$ and a public key one can verify that the components of $C=C_1 \ldots C_n$ encrypt components of $M=M_1 \ldots M_n$ wherein the norm of M is some constant k. In particular, if k=1, then the proof can be used to verify that an encrypted vector is normalized. For example, the vector $\vec{M}$ may be a biometric template. Then, with reference to FIG. 1B, a user device 145 may generate a proof $\mathcal{P}$ can prove that the biometric template has been normalized. A biometric template (or biometric measurement) with a norm greater than 1 may erroneously give a similarity metric that exceeds the threshold. An access device 155 may then evaluate the proof to verify that the biometric template received from the user device 145 is normalized.

3. Zero-Knowledge Threshold Proof

An zero-knowledge threshold proof for Paillier encryption, or ZKPEnc, may be a proof that a value encrypted by Paillier encryption is greater than a publicly known value. The zero-knowledge proof may be implemented efficiently, as an efficient zero-knowledge proof, or non-efficiently. A first device can encrypt a value m and send the ciphertext Enc(m) and the public key to a second device along with a proof that the ciphertext contains a value that is greater than a publicly known value. The second device may evaluate the proof to verify it. For example, the value may be a similarity metric. Then, with reference to FIG. 1B, a user device 145 can assert to an access device that the similarity metric exceeds a threshold without revealing the value of the similarity metric to the access device 155.

4. Garbled Circuit

Some embodiments may use a garbled circuit to evaluate a similarity metric, thereby preserving privacy of information related to the biometric template. The garbled circuit may be based on Yao's Garbled Circuit. Each party can input garbled data (e.g., according to a truth table) and then receive an output, without knowing what the other party's input was.

In a garbled circuit, a generating device knows the garbling (truth table) for a particular circuit, thereby enabling the generating device to garble inputs and to create the desired circuit. The generating device can create the circuit and an evaluating device can evaluate it, which can make sure that both devices are honest. However, in order to evaluate a garbled circuit, the evaluating device must know all of the garbled inputs. If the generating device tells the evaluating device the truth table, then the evaluating device would be able to un-garble the garbled input of the generating device, leaking information. If the evaluating device gives their input to the generating device to be garbled, then the generating device would learn the input of the evaluating device, also leaking information. To avoid this, the evaluating device can receive their garbled input via oblivious transfer, or any other similar protocol. Oblivious transfer allows the generating device to send the garbled version of the evaluating device's input, among other pieces of information, and without knowing what information the evaluating device selected. The generation and evaluation of a garbled circuit is described in further detail in Section VI.B.

Garbling a circuit, or an input, is computationally intensive operation. The problem addressed by embodiments could be solved by both devices entering their vector as an input to a garbled circuit. However, garbling an entire vector and a circuit to both compute and evaluate a similarity metric can easily become prohibitively expensive. Thus, more efficient ways to use garbled circuits are desired.

D. Security Levels and Guarantees

Different embodiments of the present disclosure provide different levels of security, and can account for different levels of device corruption. Based on the level and type of corruption, the protocols can provide different security guarantees.

1. Types of Corruption (AC and PC)

Two ways that a device may be corrupted are defined. With active corruption (AC), a compromised device can behave arbitrarily. The device can choose what information to store and it can decide to actively cheat and try to send falsified data.

The second kind of corruption is passive corruption (PC). If a device is PC, then it will appear to behave normally and follow the established protocol. However, the device will have the intent to learn more than expected. That is, it may store data that it receives beyond what it is intended to store.

Security levels can be defined as being the amount of corruption that can occur and still be can be sure that the interaction is secure.

We define Level 1 security as the user device being AC and the access device being PC. At Level 1, the user device is not allowed to present false information and the access device does not receive any information that a malicious entity might want to steal. However with Level 1 we can trust that the access device will follow protocol properly.

At Level 2 security, both the user device and the access device are AC. Both devices can behave arbitrarily and both have the potential to steal information. With this kind of security, safeguards must be put into place both to prevent sensitive information from going to the wrong device and to ensure that both devices follow the protocol. This security level is much harder to ensure.

2. Security Guarantees

Three levels of security guarantee can be defined based on the information that is leaked to each party. Information that might leak is the similarity metric of a template vector and a measurement vector. Each biometric measurement can vary slightly, and thus the similarity metrics can be different even when using the same template. Over time, an attacker (e.g., a corrupted access device, an intercepting device) may collect measurements and similarity metrics. The attacker could gather a sufficient number of measurement vectors and similarity metrics for a particular template and reconstruct the template. Thus it is desirable to limit the number of devices that can access the similarity metric.

With Guarantee 1, the similarity metric is leaked to both the user device and access device. With Guarantee 2, the similarity metric is leaked only to the user device. The user device likely already has the template, so it is less of a concern to prevent the user device from having access to the similarity metric. With Guarantee 3, the similarity metric is not leaked to either device. This is the most secure guarantee.

III. Cooperating Devices Using Homomorphic Encryption

The techniques described in this section may address deficiencies of the scenarios for biometric authentication between two devices as described in section I. The method of FIG. 2 may provide a general solution. Subsequent sections describe additional embodiments in more detail.

Figure 2:
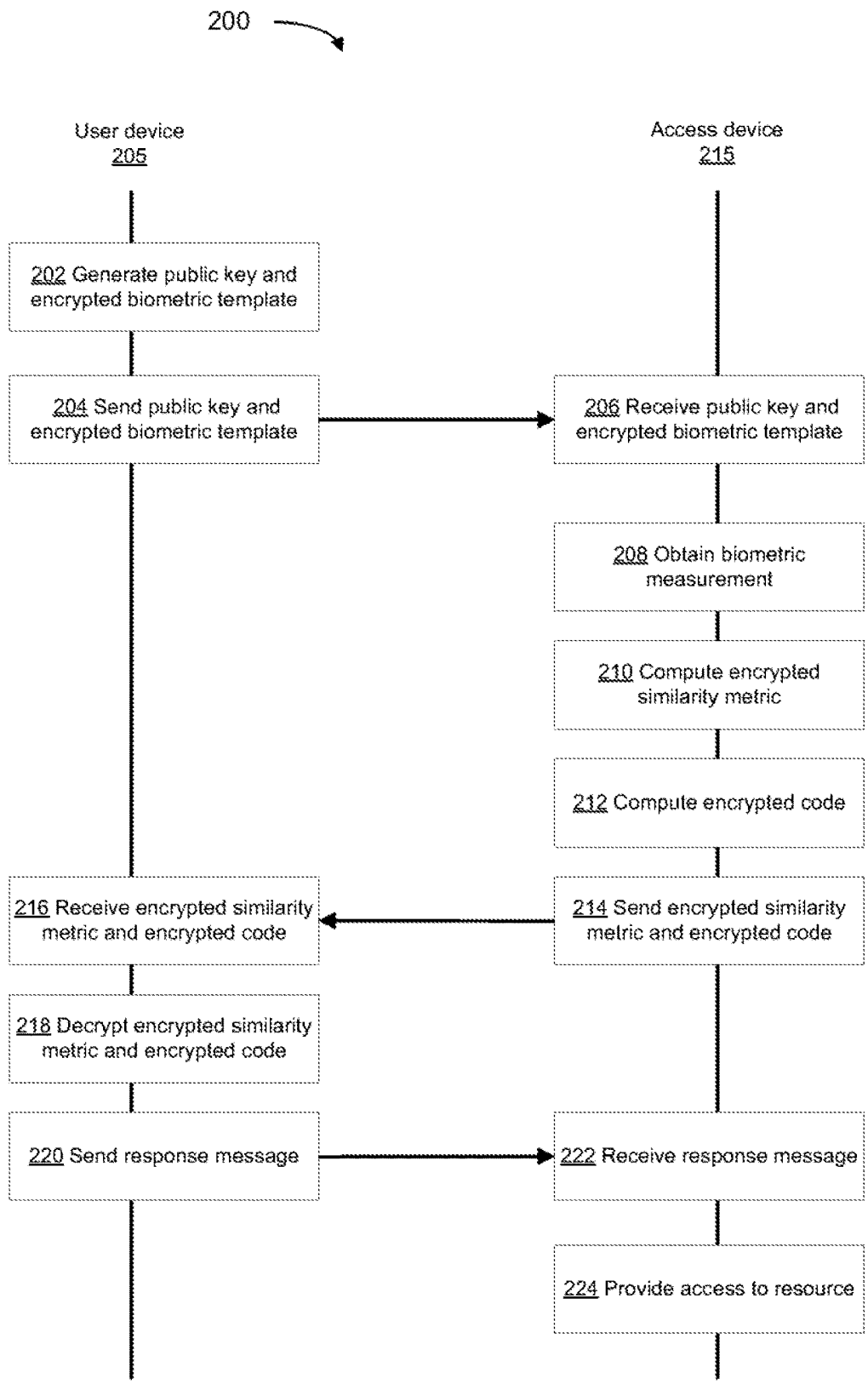
FIG. 2 shows a flow diagram of a method for authenticating a user using biometric information.

FIG. 2 shows a flow diagram of a method 200 of authenticating a user with biometric information. The user may be interacting with an access device to gain access to some resource. For example, the resource may be a secured building, a computing device, or a payment account. A user device 205 can correspond to a first device, and access device 215 can correspond to a second device. Method 200 may be triggered by user input at user device 205, e.g., initiating an authentication process with an application executing on the user device 205. As another example, method 200 may be triggered via input at access device 215, which can then send a message to user device to initiate the authentication process. The input at access device 215 may be provided by a different user or the same user of user device 205, e.g., by a user walking by a sensor of access device 215 to trigger the authentication process.

In step 202, user device 205 can generate a public key and an encrypted biometric template. The biometric template may have been encrypted with the public key and an associated private key, following a homomorphic encryption scheme. The user device 205 may also generate one or more encrypted masks by encrypting one or more randomly selected values (also referred to as mask values, e.g., when not randomly selected), which may be later used to mask a similarity metric. In some embodiments, the user device 205 may generate an indicator that the biometric template that was encrypted is in proper format. For example, the user device 205 may also generate a proof-of-knowledge indicating that the plaintext biometric template is normalized (e.g., a vector with a total length 1).

In step 204, the user device 205 can send the public key and the encrypted biometric template to an access device 215. The user device 205 may also send the indicator (e.g., the proof-of-knowledge) and/or the one or more encrypted masks.

In step 206, the access device 215 can receive the public key and the encrypted biometric template from the user device 205. The access device may also receive the indicator (e.g., the proof-of-knowledge). In some embodiments, the access device 215 may then evaluate the proof-of-knowledge, using the encrypted biometric template, to confirm that the plaintext biometric template is normalized. If the access device 215 does not receive an expected indicator that the plaintext biometric template is in proper format, the access device 215 may abort the process. In other embodiments, the access device 215 may assume the plaintext biometric template is in the proper format. The access device 215 may also receive the one or more encrypted masks.

In step 208, the access device 215 may obtain a biometric measurement of the user using one or more sensors. For example, the access device 215 may use a fingerprint reader to capture a finger print of the user. In another example, the access device 215 may use a camera to capture a facial scan of the user. The access device 215 may then store the biometric measurement as a vector, and may normalize the biometric measurement vector.

In step 210, the access device 215 can compute an encrypted similarity metric using a similarity measure. For example, the similarity measure may be cosine similarity, and the similarity metric may be an inner product. By encrypting the biometric template with a homomorphic encryption scheme, the access device 215 can perform computations on the encrypted information as if it were plaintext, without needing to decrypt it. The access device 215 may use the public key when computing the similarity metric. The access device 215 may use the one or more encrypted masks to mask the encrypted similarity metric. The access device 215 may also use one or more random values to mask the encrypted similarity metric.

In step 212, in some embodiments, the access device 215 can optionally compute an encrypted code. The encrypted code may be an authentication function of the encrypted similarity metric and one or more randomly selected values. For example, the authentication function may be a linear function of the encrypted similarity metric and the randomly selected values. The encrypted code may be a one-time message authentication code (MAC). The encrypted code may be computed with the public key, using properties of homomorphic encryption. The encrypted code can be used to increase the security of the authentication process, if higher security is desired.

In step 214, the access device 215 can send a message to the user device 205. The message may include the encrypted similarity metric. In some embodiments, the message may also include the encrypted code. The message may be sent via any suitable wired or wireless protocol, e.g., via Bluetooth or WiFi.

In step 216, the user device 205 can receive the message from the access device 215. The message can be received via any suitable wired or wireless protocol. The message can include a flag indicating it is part of the initiated authentication process.

In step 218, the user device 205 can decrypt the encrypted similarity metric and can optionally decrypt the encrypted code (if received). The decrypted similarity metric may be masked. For example, the access device 215 may have added a random value to the similarity metric. In this way, the user device 205 may not learn the value of the decrypted similarity metric. The decrypted similarity metric may alternatively be masked by the one or more encrypted masks generated by the user device 205. This may prevent the access device 215 from learning the value of the decrypted similarity metric.

In step 220, the user device 205 may send a response message to the access device 215. The response message may indicate (1) whether the decrypted similarity metric exceeds a threshold. If the similarity metric exceeds the threshold the biometric measurement may be said to match the biometric template, wherein matching indicates that the biometric measurement and the biometric template likely came from the same user. In that case, the access device 215 may verify the user. If the similarity metric is less than the threshold, the access device may abort the process.

The response message may also indicate (2) whether the decrypted code matches a test code. The test code may be computed with the same authentication function used in step 210 to compute the encrypted code. The test code may be computed with the decrypted similarity metric and the one or more randomly selected values. If the test code and decrypted code match, it may indicate that the user device did not modify the similarity metric when decrypting it. The user device 205 does not have access to the randomly selected values, so it may not be able to send a fraudulent decrypted similarity metric that will still generate the correct test code. If the test code and decrypted code do not match, the access device may abort the process.

In various embodiments, the response message may include the decrypted similarity metric and/or the decrypted code, thereby having the response message indicate (1) and/or (2), even if the final determination is made by the second device. In other embodiments, the response message may provide a more direct indication, e.g., when a garbled circuit is implemented and used at the first device.

In step 222, the access device 215 may receive the response message from the user device 205. If the access device 215 receives the decrypted code in the response message, the access device 215 may compute the test code and compare the test code to the decrypted code. In other embodiments, a garbled circuit may be used to compute the test code and compare the test code to the decrypted code. The access device 215 may generate the garbled circuit, then send it to the user device 205 to be evaluated. Then the response message may include an output of the garbled circuit.

If the access device 215 receives the decrypted similarity metric in the response message, the access device 215 may compare the decrypted similarity metric to the threshold directly. In other embodiments, the decrypted similarity metric may be masked. The access device 215 may also receive a proof-of-knowledge indicating whether the similarity metric exceeds the threshold. In other embodiments, a garbled circuit may be used to determine whether the decrypted similarity metric exceeds the threshold. The access device 215 may generate the garbled circuit, then send it to the user device 205 to be evaluated. Then the response message may include an output of the garbled circuit.

In step 224, the access device 215 may allow the user to access the resource. Prior to allowing the user to access the resource, the access device 215 may perform additional authentication and/or authorization steps. For example, the access device may request that the user enter a personal identification number (PIN) or a password for further authentication. The access device 215 may communicate with additional computer devices, such as an authentication computer and/or an authorization computer, to perform the additional authentication and/or authorization steps.

The resource may generally be, for example, a computer resource (e.g., stored data or a networked computer account), a physical resource (e.g., a tangible object or a physical location), or other electronic resource or communication between computers (e.g., a communication signal corresponding to an account for performing a transaction). Additional examples of a resource may include a good or service, a physical building, a computer account or file, or a payment account. For example, the access device 215 may allow the user to access a physical building by unlocking a door. In another example, the access device 215 may allow the user to access an electronic payment by providing access to a payment process.

Embodiments of the present disclosure may modify this method to provide increased data security, for example, by preventing the access device and or the user device from receiving the decrypted similarity metric.

Each of the following sections correspond to different protocols for evaluating the similarity metric and the authentication code. The different protocols may provide different levels of security and security guarantees. Each protocol may be done with any similarity measure appropriate to the biometric data being captured.

IV. Second Device Learning Similarity Metric

Some embodiments provide a method of authentication with homomorphic calculation of similarity metric and a proof-of-knowledge. In protocol-1, by using homomorphic encryption, the similarity metric can be calculated by an access device without revealing the plaintext value of the biometric template. However, the plaintext similarity metric may be leaked to the access device and the phone so that they may verify that the similarity metric exceeds a threshold and indicates a match. Thus, this embodiment can provide security guarantee 1. The proof-of-knowledge can allow the phone to prove that the biometric template is in the proper format (i.e. normalized) without revealing the template to the terminal. Thus, protocol-1 can work at security level 1.

Figure 3:
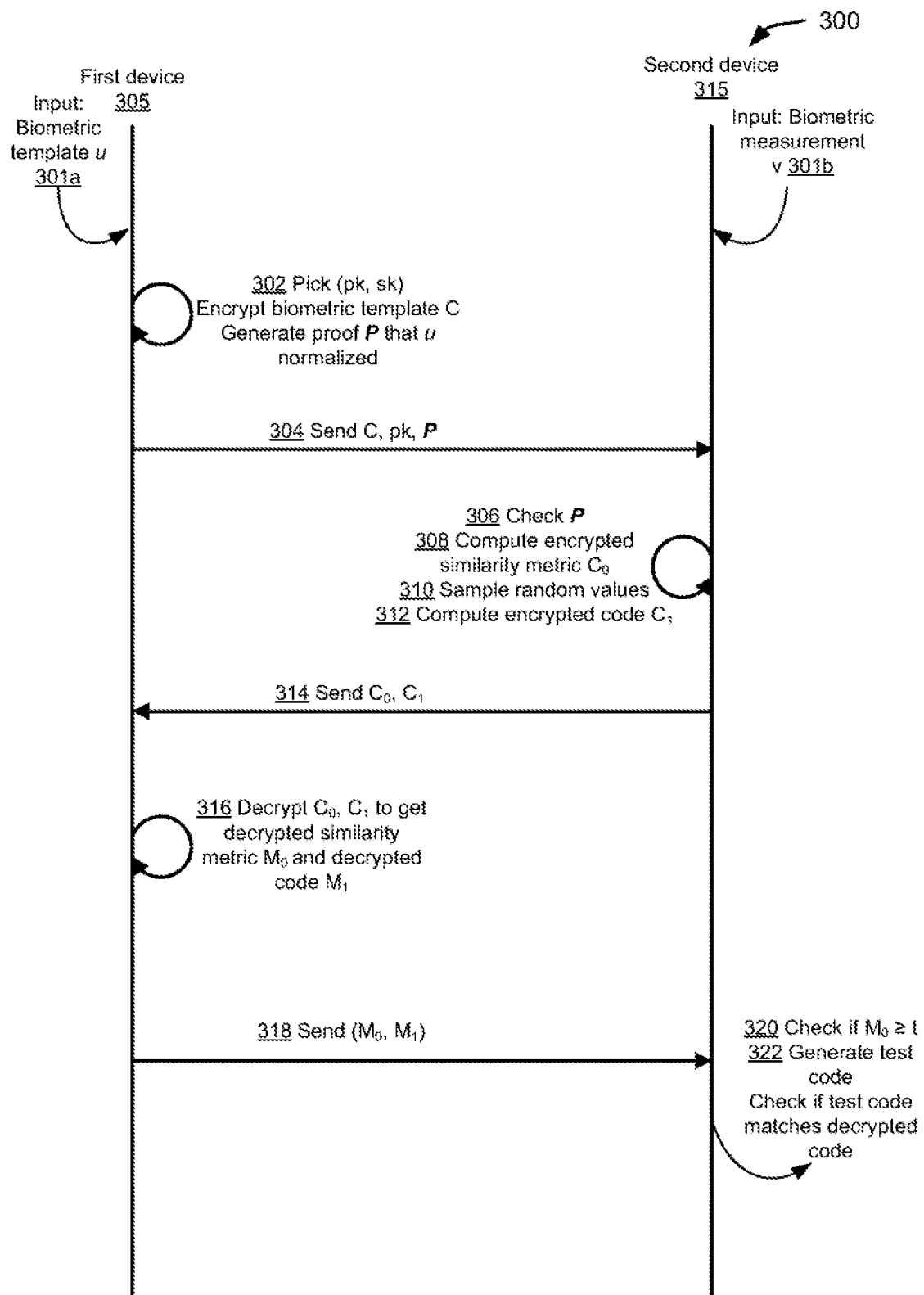
FIG. 3 is a flow diagram illustrating a process where a similarity metric is leaked to the second device according to embodiments of the present disclosure.

FIG. 3 is a flow diagram illustrating a process 300 where a similarity metric is leaked to the second device according to embodiments of the present disclosure. Process 300 may occur when a user attempts to access a protected resource, such as a financial account or a secured building. The user may use a first device 305 to initiate access with a second device 315 that controls access to the protected resource. Alternatively, the user may initiate access with the second device 315 directly. In some embodiments, the first device 305 may be a mobile device of the user and the second device 315 may be an access device.

Prior to process 300, the first device 305 may have a biometric template of the user stored as a vector $\vec{u}$ 301a. The second device 315 may capture a biometric measurement of the user and store the biometric measurement as a vector $\vec{v}$ 301b.

In step 302, the first device 305 can perform some initialization procedures. For example, first device 305 can select a public key (pk) and a secret key (sk) for an additively homomorphic encryption scheme. The first device 305 may then use this encryption scheme to generate an encrypted template C, by encrypting the biometric template $\vec{u}$ 301a as C=Enc($\vec{u}$). In some embodiments, the first device 305 may optionally generate a proof-of-knowledge $\mathcal{P}$ that the biometric template $\vec{u}$ 301a is normalized. The proof $\mathcal{P}$ may be a proof-of-knowledge of encrypted plaintext of particular size. The first device 305 could send a false template that is very large, for example, with a norm much greater than 1. The false template may lead to a similarity metric that exceeds the threshold even if the template 301a does not match the measurement 301b, allowing the user to fraudulently gain access to the resource. In other embodiments, the first device 305 may not generate and/or send a proof-of-knowledge.

In step 304, the first device 305 can send a message with the encrypted template C, the public key pk, and the proof-of-knowledge $\mathcal{P}$ to the second device 315. For example, the devices may communicate over a wireless connection such as Wi-Fi, Bluetooth, and NFC. Steps 302 and 304 may occur before the user initiates access with the second device 315. Additionally, steps 302 and 304 may occur before the second device 315 captures a biometric measurement 301b of the user. For example, the user may intend to use biometric authentication when paying for a purchase at a store. Then, the user may use the first device 305 (e.g., their mobile phone) send the encrypted template C, the public key pk, and the proof-of-knowledge $\mathcal{P}$ to the second device 315 (e.g., a point of sale terminal in the store) when they first enter the store. The second device 315 may capture the biometric measurement 301b when the user enters the store or when the user is ready to check out. The rest of the protocol may then occur when the user checks out and pays for their purchase.

In step 306, the second device 315 can check $\mathcal{P}$ to verify that the biometric template u 301a is normalized. If the proof fails and second device 315 determines that the biometric template $\vec{u}$ 301a is not normalized, the second device 315 may abort the protocol. This ensures that, even if the first device 305 if AC, it still sends a valid input. Also, because of the proof-of-knowledge, the second device 315 can verify this without knowing the value of the biometric template $\vec{u}$ 301a. If the vector is properly normalized, the second device 315 can proceed.

At step 308, second device 315 computes an encrypted similarity metric $C_0$=Enc(IP($\vec{u},\vec{v}$)) using the encrypted template C, the biometric measurement $\vec{v}$ 301b, and the public key pk. IP($\vec{u},\vec{v}$) may be the similarity metric. For example, the similarity metric being used may be cosine similarity, and the similarity metric may be an inner product. Because the encryption scheme chosen by the first device 305 is additively homomorphic, the second device 315 can compute $C_0$ without decrypting C to get $\vec{u}$.

In step 310, in some embodiments, the second device 315 can optionally sample one or more random values. For example, the second device 315 may sample two values, a and b. The random values can be inputs for an authentication function.

In step 312, in some embodiments, the second device 315 can optionally compute an encrypted code $C_1$ using the encrypted similarity metric, the one or more random values, and the authentication function. For example, the authentication function may be a linear function. Then the encrypted code may be $C_1$=Enc(a*IP($\vec{u},\vec{v}$)+b). The encrypted code may be a one-time message authentication code (MAC). The encrypted code may allow the second device 315 to later validate messages that it receives from the first device 305. The first device 305 may not know or learn the one or more random values use to generate the encrypted code. Therefore the first device 305 may not be able to tamper with the similarity metric in a way that will give the correct encrypted code. In embodiments where passive corruption is assumed, the second device 315 may not be able to deviate from the protocol to falsely compute a similarity metric, so the encrypted code $C_1$ may not be used.

In step 314, the second device 315 can send a message with the encrypted similarity metric $C_0$ and the encrypted code $C_1$ to the first device 305.

In step 316, the first device 305 can use the secret key sk to decrypt the encrypted similarity metric $C_0$ and optionally decrypt the encrypted code $C_1$ (if received) to get a decrypted similarity metric $M_0$=Dec($C_0$) and a decrypted code $M_1$=Dec($C_1$). It may be that $M_0$=IP($\vec{u},\vec{v}$), and thus the similarity metric can leak to the first device 305. This can allow the first device 305 to independently verify if the biometric matching was successful if the first device 305 compares the similarity metric to a threshold t.

In step 318, the first device 305 can send a message with the decrypted similarity metric $M_0$ and the decrypted code $M_1$ to the second device 315. If $M_0$=IP($\vec{u},\vec{v}$), then the second device 315 may also learn the value of the similarity metric.

In step 320, the second device 315 can check if the decrypted similarity metric exceeds the threshold t. The second device 315 can do this by evaluating $M_0 \geq t$. If the similarity metric exceeds the threshold the biometric measurement 301b may be said to match the biometric template 301a, wherein biometric matching indicates that the biometric measurement 301b and the biometric template 301a likely came from the same user. If the similarity metric is less than the threshold, the second device may abort the process.

In step 322, in some embodiments, the second device 315 can optionally generate a test code, using the one or more random values and authentication function of step 312 in addition to the decrypted similarity metric. For example, if the authentication function was a linear function, the test code may be a*$M_0$+b. If the test code matches the decrypted code (e.g., a*$M_0$+b=$M_1$), then the message from the first device 305 can be validated. Because the first device 305 does not know the random values, it cannot send a falsified decrypted similarity metric (e.g., to force the biometric match to a desired result) that still satisfies the test code.

If the similarity metric exceeds the threshold and the message is validated, then the second device 315 can be assured that the biometric measurement 301b is a valid match to the biometric template 301a on the first device 305. The second device 315 may then allow the user access to the protected resource. If the similarity metric does not exceed the threshold and/or the message is not validated, the second device 315 can abort the protocol and deny the user access to the protected resource.

Embodiments that do not use a zero knowledge proof or encrypted code may be more efficient. Zero knowledge proofs may be computationally expensive, and omitting the encrypted code can decrease the amount of data that must be encrypted and decrypted. Such embodiments may be used in situations where it is assumed that first device 305 and second device 315 will adhere to the protocol (e.g., one or both devices are passively corrupt). Embodiments that use a zero knowledge proof and/or an encrypted code may increase security. The zero knowledge proof can help ensure validity of the biometric template sent by first device 305 and the encrypted code can verify the computation of the similarity metric.

V. Zero-Knowledge Threshold Proof Protocol

The zero-knowledge threshold proof protocol can make the method of protocol-1 more secure by adding an zero-knowledge proof (ZKPEnc) in addition to an encrypted code. The ZKPEnc may be implemented as an efficient zero-knowledge proof. The zero-knowledge threshold proof allows a first device to assert that the similarity metric exceeds a threshold, without revealing the similarity metric to a second device. Because information is no longer leaked to the second device, it provides security guarantee 2. The zero-knowledge threshold proof protocol also works at security level 1.

Figure 4:
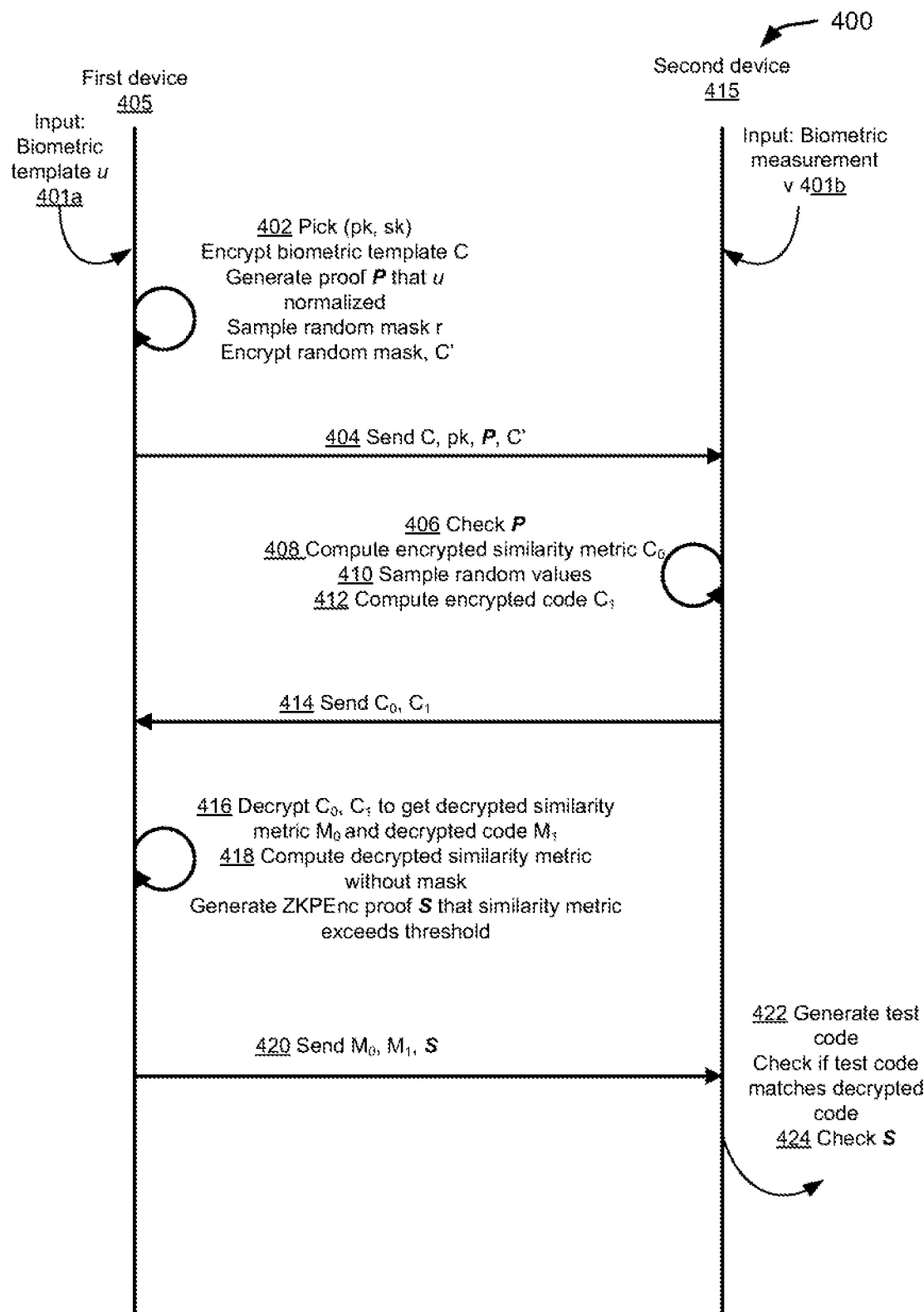
FIG. 4 is a flow diagram illustrating a process using a zero-knowledge threshold proof protocol according to embodiments of the present disclosure.

FIG. 4 is a flow diagram illustrating a process 400 using an zero-knowledge proof threshold protocol according to embodiments of the present disclosure. Process 400 may occur when a user attempts to access a protected resource, such as a financial account or a secured building. The user may use a first device 405 to initiate access with a second device 415 that controls access to the protected resource. Alternatively, the user may initiate access with the second device 415 directly. In some embodiments, the first device 405 may be a mobile device of the user and the second device 415 may be an access device.

Prior to process 400, the first device 405 may have a biometric template $\vec{u}$ 401a of the user stored as a vector. The second device 415 may capture a biometric measurement of the user and store the biometric measurement $\vec{v}$ 401b as a vector.

In step 402, the first device 405 can perform some initialization procedures. For example, first device 405 can select a public key (pk) and a secret key (sk) for an additively homomorphic encryption scheme. The first device 405 may then use this encryption scheme to generate an encrypted template C, by encrypting the biometric measurement $\vec{u}$ 401a as C=Enc($\vec{u}$). The first device may also generate a proof-of-knowledge $\mathcal{P}$ that the biometric template $\vec{u}$ 401a is normalized. The proof $\mathcal{P}$ may be a proof-of-knowledge of encrypted plaintext of particular size. The first device 405 can send a false template that is very large, for example with a norm much greater than 1. The false template may lead to a similarity metric that exceeds the threshold even if the biometric template 401a does not match the biometric measurement 401b, allowing the user to fraudulently gain access to the resource. In some embodiments, the first device 405 may not generate and/or send a proof-of-knowledge. The phone may also sample a random value r which may be used to mask information from the second device. The first device may then generate an encrypted mask by encrypting r as C'=Enc(r).

In step 404, the first device 405 can send a message with the encrypted template C, the public key pk, the proof-of-knowledge $\mathcal{P}$, and the encrypted mask C' to the second device 415. For example, the devices may communicate over a wireless connection such as Wi-Fi, Bluetooth, and NFC. Steps 402 and 404 may occur before the user initiates access with the second device 415. Additionally, steps 402 and 404 may occur before the second device 415 captures a biometric measurement 401b of the user. For example, the user may intend to use biometric authentication when paying for a purchase at a store. Then, the user may use the first device 405 (e.g., their mobile phone) send the encrypted template C, the public key pk, the proof-of-knowledge $\mathcal{P}$, and the encrypted mask C' to the second device 415 (e.g., a point of sale terminal in the store) when they first enter the store. The second device 415 may capture the biometric measurement 401b when the user enters the store or when the user is ready to check out. The rest of the protocol may then occur when the user checks out and pays for their purchase.

In step 406, the second device 415 can check the proof $\mathcal{P}$ to verify that the biometric template $\vec{u}$ 401a is normalized. If the proof fails and second device 415 determines that the biometric template $\vec{u}$ 401a is not normalized, the second device 415 may abort the protocol. This ensures that, even if the first device 405 if AC, it still sends a valid input. Also, because of the proof-of-knowledge, the second device 415 can verify this without knowing the value of the biometric template $\vec{u}$ 401a. If the vector is properly normalized, the second device 415 can proceed.

In step 408, the second device 415 can compute an encrypted similarity metric $C_0$=Enc(e), using the encrypted template C, the biometric measurement $\vec{v}$ 401b, the encrypted mask C' and the public key pk. In the encrypted similarity metric, e=IP($\vec{u},\vec{v}$)+r where IP($\vec{u},\vec{v}$) is the similarity metric. For example, the similarity metric being used may be cosine similarity, and the similarity metric may be an inner product. In contrast to protocol-1, the similarity metric can be masked in the encrypted similarity metric. Because the encryption scheme chosen by the first device 405 is additively homomorphic, the second device 415 can compute $C_0$ without decrypting the encrypted template C or the encrypted mask C' to get $\vec{u}$ and r.

In step 410, the second device 415 can sample one or more random values. For example, the second device 415 may sample two values, a and b. The random values can be inputs for an authentication function.

In step 412, the second device 415 can compute an encrypted code $C_1$ using the encrypted similarity metric, the one or more random values, and the authentication function. For example, the authentication function may be a linear function. Then the encrypted code may be $C_1$=Enc(a*e+b). The encrypted code may be a one-time message authentication code (MAC). The encrypted code may allow the second device 415 to later validate messages that it receives from the first device 405. The first device 405 may not know or learn the one or more random values use to generate the encrypted code. Therefore the first device 405 may not be able to tamper with the similarity metric in a way that will give the correct encrypted code.

In step 414, the second device 415 can send a message with the encrypted similarity metric $C_0$ and the encrypted code $C_1$ to the first device 405.

In step 416, the first device 405 can use the secret key sk to decrypt the encrypted similarity metric $C_0$ and the encrypted code $C_1$ to get a decrypted similarity metric $M_0=Dec(C_0)$ and a decrypted code $M_1=Dec(C_1)$. It may be that $M_0=e=IP(\vec{u},\vec{v})+r$, and thus the similarity metric is leaked to the first device 405 because the first device knows the value of r. This can allow the first device 405 to independently verify if the biometric matching was successful if the first device 405 compares the similarity metric to a threshold t for biometric matching.

In step 418, the first device 405 can compute Enc(x) homomorphically from the decrypted similarity metric $M_0$ and the encrypted mask C', where $x=IP(\vec{u},\vec{v})$. The first device 405 can compute this with $Enc(x)=M_0-C'$. To compute this the first device 405 may first re-encrypt $M_0$. The first device 405 can then generate a threshold proof S that Enc(x) encrypts a value that is greater than t, where t is the predetermined threshold. The threshold proof may be a ZKPEnc proof. The ZKPEnc proof can allow the first device 405 to assert to the second device 415 that the similarity metric exceeds the threshold without revealing the similarity metric to the second device 415. As one example, the threshold proof may be generated by a method similar to that in Appendix A of Lindell, Fast secure two-party ECDSA signing, Cryptogology ePrint Archive, hereby incorporated by reference in its entirety. Other embodiments may use other techniques. When verifying the ZKPEnc proof S, the second device 415 uses the encryption of the value in question, or Enc(x). The second device 415 can be better assured of the validity if the encrypted value Enc(x) is derived directly from $M_0$, which is in turn derived directly from $C_0$, the encrypted similarity metric as computed by the second device 415. The second device 415 can use the authentication function to validate $M_0$, and then derive Enc(x). Therefore, even if the first device 405 is AC, it cannot generate a false ZKPEnc proof for some value that is not the similarity metric that will satisfy the second device 415.

In step 420, the first device 405 can send a message with the decrypted similarity metric $M_0$, the decrypted code $M_1$, and the threshold proof $\mathcal{S}$ to the second device 415. As $M_0$ may be the similarity metric, masked by the random variable r, the second device 415 may not learn the similarity metric from $M_0$. $M_1$ may also comprise the similarity metric masked by r, so the second device 415 may not learn the similarity metric from $M_1$ as well.

In step 422 the second device 415 can generate a test code, using the one or more random values and authentication function of step 412 in addition to the decrypted similarity metric. For example, if the authentication function was a linear function, the test code may be $a*M_0+b$. If the test code matches the decrypted code (e.g., $a*M_0+b=M_1$), then the message from the first device 405 can be validated. Because the first device 405 does not know the random values, it cannot send a falsified decrypted similarity metric (e.g., to force the biometric match to a desired result) that still satisfies the test code. If the message is not validated, then the second device 415 can abort the protocol.

In step 424, the second device 415 can derive Enc(x) from $M_0$ and C'. The second device 415 can compute this with $Enc(x)=M_0-C'$ as the first device 405 did in step 418. The second device 415 can then check the threshold proof $\mathcal{S}$. Verifying the threshold proof may be done in a way similar to that outlined in Appendix A of Lindell. If the second device 415 verifies the proof, then the second device 415 can confirm that the similarity metric exceeds the threshold. If the proof fails, the second device 415 can abort the protocol. If the similarity metric exceeds the threshold and the message is validated, then the second device 415 can be assured that the biometric measurement 401b is a valid match to the biometric template 401a on the first device 405. The second device 415 may then allow the user access to the protected resource.

VI. Garbled Circuit Protocol

The garbled circuit protocol can make the method of protocol-1 more secure by adding a garbled circuit. The use of a garbled circuit can also make the garbled circuit protocol more secure than the zero-knowledge threshold proof protocol. The garbled circuit can evaluate whether the similarity metric exceeds a threshold without revealing the similarity metric to either party. Thus the garbled circuit protocol can provide security guarantee 3. The garbled circuit protocol also works at security level 1.

A. Use of Garbled Circuit

Figure 5:
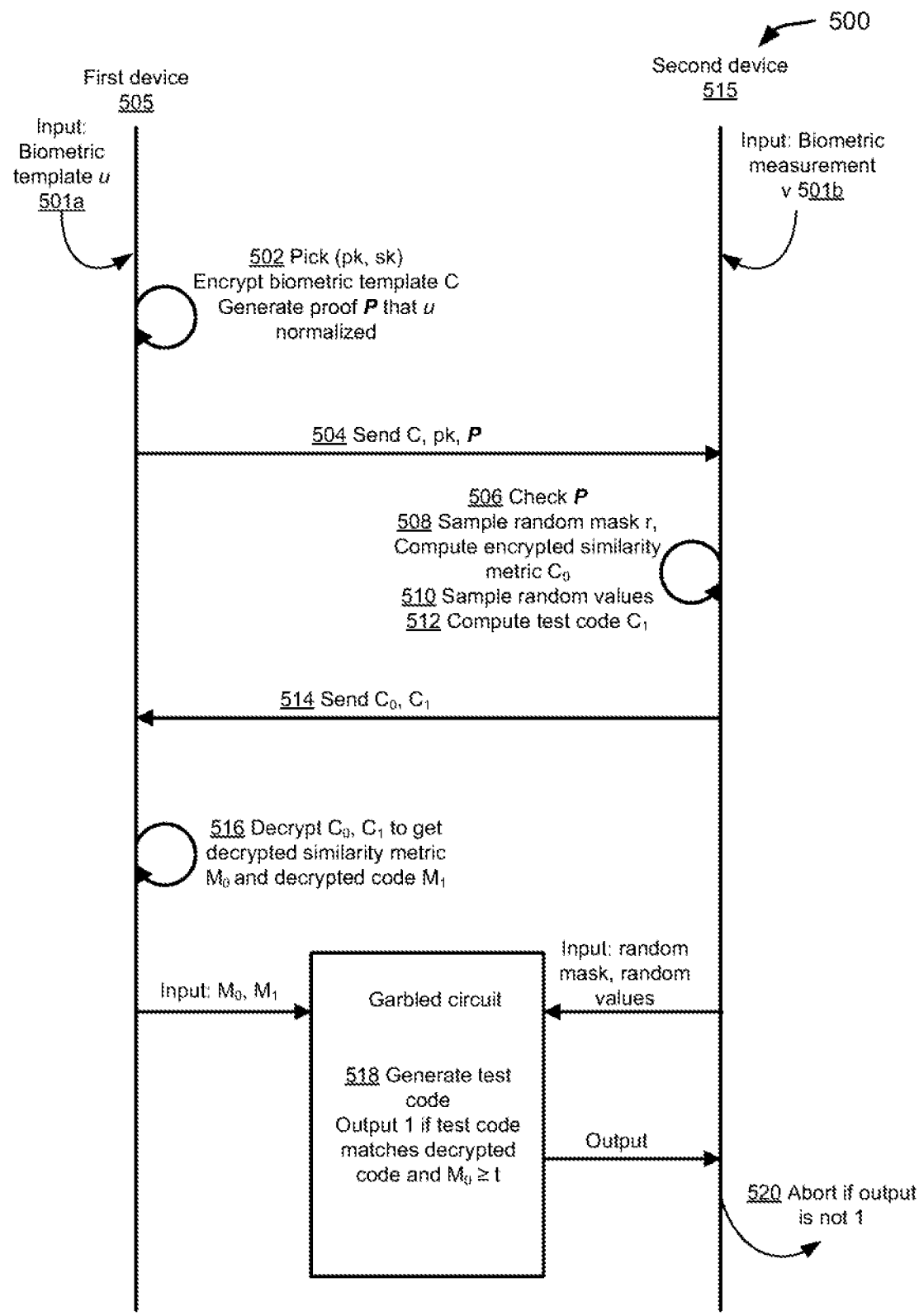
FIG. 5 is a flow diagram illustrating a process using a garbled circuit protocol according to embodiments of the present disclosure.

FIG. 5 is a flow diagram illustrating a process 500 using a garbled circuit protocol according to embodiments of the present disclosure. Process 500 may occur when a user attempts to access a protected resource, such as a financial account or a secured building. The user may use a first device 505 to initiate access with a second device 515 that controls access to the protected resource. Alternatively, the user may initiate access with the second device 515 directly. In some embodiments, the first device 505 may be a mobile device of the user and the second device 515 may be an access device.

Prior to process 500, the first device 505 may have a biometric template of the user stored as a vector $\vec{u}$ 501a. The second device 515 may capture a biometric measurement of the user and store the biometric measurement as a vector $\vec{v}$ 501b.

In step 502, the first device can perform some initialization procedures. For example, first device 505 can select a public key (pk) and a secret key (sk) for an additively homomorphic encryption scheme. The first device 505 may then use this encryption scheme to generate an encrypted template C, by encrypting the biometric template $\vec{u}$ 501a as $C=Enc(\vec{u})$. The first device 505 may also generate a proof-of-knowledge $\mathcal{P}$ that the biometric template $\vec{u}$ 501a is normalized. The proof $\mathcal{P}$ may be a proof-of-knowledge of encrypted plaintext of particular size. The first device 505 can send a false template that is very large, for example with a norm much greater than 1. The false template may lead to a similarity metric that exceeds the threshold even if the template 501a does not match the measurement 501b, allowing the user to fraudulently gain access to the resource. In some embodiments, the first device 505 may not generate and/or send a proof-of-knowledge.

In step 504, the first device 505 can send a message with the encrypted template C, the public key pk, and the proof-of-knowledge $\mathcal{P}$ to the second device 515. For example, the devices may communicate over a wireless connection such as Wi-Fi, Bluetooth, and NFC. Steps 502 and 504 may occur before the user initiates access with the second device 515. Additionally, steps 502 and 504 may occur before the second device 515 captures a biometric measurement 501b of the user. For example, the user may intend to use biometric authentication when paying for a purchase at a store. Then, the user may use the first device 505 (e.g., their mobile phone) send the encrypted template C, the public key pk, and the proof-of-knowledge $\mathcal{P}$ to the second device 515 (e.g., a point of sale terminal in the store) when they first enter the store. The second device 515 may capture the biometric measurement 501b when the user enters the store or when the user is ready to check out. The rest of the protocol may then occur when the user checks out and pays for their purchase.

In step 506, the second device 515 can check $\mathcal{P}$ to verify that $\vec{u}$ is normalized. If the proof fails and second device 515 determines that $\vec{u}$ is not normalized, the second device 515 may abort the protocol. This ensures that, even if the first device 505 if AC, it still sends a valid input. Also, because of the proof-of-knowledge, the second device 515 can verify this without knowing the value of $\vec{u}$. If the vector is properly normalized, the second device 515 can proceed.

At step 508, the second device 515 can sample a random masking value r. The second device 515 can then compute $C_0$=Enc(e), where e=IP($\vec{u},\vec{v}$)+r and IP($\vec{u},\vec{v}$) is the similarity metric. For example, the similarity metric being used may be cosine similarity, and the similarity metric may be an inner product. Because the encryption scheme chosen by the first device 505 is additively homomorphic, the second device 515 can compute $C_0$ without decrypting C to get u. In contrast to the zero-knowledge threshold proof protocol, the encrypted similarity metric is masked by the second device 515 and not the first device 505.

In step 510, the second device 515 can sample one or more random values. For example, the second device 515 may sample two values, a and b. The random values can be inputs for an authentication function.

In step 512, the second device 515 can compute an encrypted code $C_1$ using the encrypted similarity metric, the one or more random values, and the authentication function. For example, the authentication function may be a linear function. Then the encrypted code may be $C_1$=Enc(a*e+b). The encrypted code may be a one-time message authentication code (MAC). The encrypted code may allow the second device 515 to later validate messages that it receives from the first device 505. The first device 505 may not know or learn the one or more random values use to generate the encrypted code. Therefore the first device 505 may not be able to tamper with the similarity metric in a way that will give the correct encrypted code.

In step 514, the second device 515 can send a message with the encrypted similarity metric $C_0$ and the encrypted code $C_1$ to the first device 505.

In step 516, the first device 505 can use the secret key sk to decrypt the encrypted similarity metric $C_0$ and the encrypted code $C_1$ to get a decrypted similarity metric $M_0$=Dec($C_0$) and a decrypted code $M_1$=Dec($C_1$). It may be that $M_0$=e=IP($\vec{u},\vec{v}$)+r, and thus the first device 505 may not learn the similarity metric because it may not know the masking value r. This is in contrast to the previous protocols.

The second device 515 may then generate a garbled circuit. The generation and evaluation of a garbled circuit may be described in greater detail in FIG. 6 below. The garbled circuit can be configured to take as inputs the decrypted similarity metric $M_0$, the decrypted code $M_1$, and the one or more random values (e.g., a and b) and the masking value r. The garbled circuit may also have as a fixed input a threshold t. The garbled circuit may be configured to compute a test code, using the one or more random values and the authentication function of step 512. For example, if the authentication function was a linear function, the test code may be a*$M_0$+b. If the test code equals the decrypted code (e.g., a*$M_0$+b=$M_1$) then the inputs of $M_0$ and $M_1$ may be validated. The garbled circuit may also be configured to compute the similarity metric, using $M_0$-r. If $M_0$-r>t, then the similarity metric exceeds the threshold. If the similarity metric exceeds the threshold and the inputs are validated (e.g., $M_0$-r>t and a*$M_0$+b=$M_1$) then the garbled circuit may output a 1, or some other indication that the biometric measurement is a valid match. Otherwise, the garbled circuit may output a 0, indicating that one or more of the computations failed.

Once the garbled circuit has been generated, the second device 515 may send the garbled circuit to the first device 505 so that the first device 505 may evaluate the garbled circuit. The second device 515 may also send garbled versions of the one or more random values and the masking value r to the first device 505 to be used as inputs. The second device 515 may also provide garbled versions of the inputs from the first device 505, $M_0$ and $M_1$, using a method such as oblivious transfer. By using oblivious transfer, first device 505 can receive garbled inputs without having to reveal what the plaintext inputs are, and without learning the garbling labels.

In step 518, the first device 505 may evaluate the garbled circuit. The first device 505 may then receive an output of 1 or 0, and send the output to the second device 515.

In step 520, the second device 515 can assess the output received from the first device 505. If the output is not 1, then the second device 515 may abort the protocol. If the output is 1, then the then the second device 515 can be assured that the biometric measurement 501b is a valid match to the biometric template 501a on the first device 505. The second device 515 may then allow the user access to the resource.

B. Generation of Garbled Circuit

Figure 6:
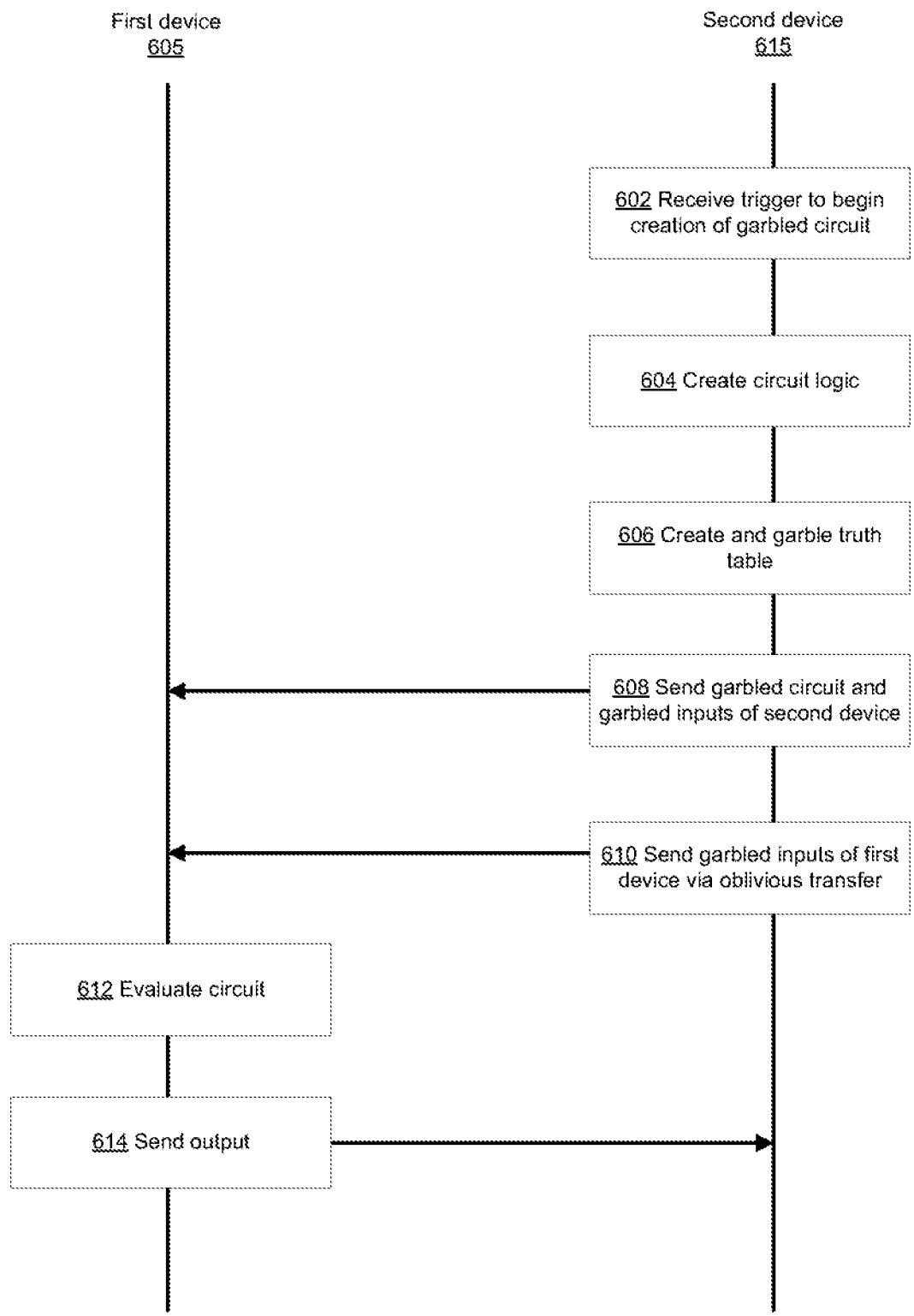
FIG. 6 is a flow diagram illustrating a process of generating and evaluating a garbled circuit.

The process of generating and evaluating a garbled circuit may be described in more detail with reference to FIG. 6. In this example, the second device may be the device generating the garbled circuit and the first device may be the device evaluating the garbled circuit.

In step 602, the second device 615 may receive a trigger to begin the creation of the garbled circuit. The example, the trigger may be the sending of encrypted information to the first device 605, as in step 514 of FIG. 5.

In step 604, the second device 615 can create the logic for the circuit to compute the desired function. Some values, such as the threshold, may be a part of the circuit itself. This may mean that the threshold is not input into the garbled circuit. The second device 615 may then create a truth table for the circuit. The second device 615 may create a truth table for each logic gate that comprises the circuit.

In step 606, the second device 615 can select random garbling labels for each input bit and can use them to encode the inputs of the truth table. The second device can use the labels to encrypt the outputs of the truth table. The second device 615 may do this for each logic gate of the circuit. The second device 615 may also permute the garbled outputs of the truth table. This may prevent the first device 605 from inferring additional information about the circuit from the structure of the truth table. The garbled output values of the truth table may comprise the garbled circuit.

In step 608, the second device 615 can send, to the first device 605, the garbled circuit and the garbled inputs of the second device 615. The first device 605 may not know the garbling labels or have the truth table, so the first device 605 may not learn what the inputs from the second device 615 are. If the first device 605 learned the inputs, the first device 605 could learn what the similarity metric is and/or change the similarity metric and the decrypted code in a way that still generated a valid test code.

In step 610, second device 615 can provide the first device 605 with garbled versions of the inputs from the first device 605 via oblivious transfer (OT). By using OT, the first device 605 may receive the garbled labels that correspond to its inputs without the second device 615 learning which inputs the first device 605 is receiving. This may prevent the second device 615 from learning the inputs of the first device 605. OT may also prevent the first device 605 from learning the garbled labels that correspond to other inputs. In particular, this may prevent the first device 605 from learning the inputs of the second device 615. The first device can receive their inputs bit by bit.

In step 612, the first device 605 can evaluate the garbled circuit. In evaluating the garbled circuit, the first device 605 can attempt to decrypt each garbled outputs using the garbled input values. The output that corresponds to the inputs of both devices will be the only output that can be decrypted. The first device 605 may determine the correct output by decrypting the results of each logic gate in the circuit individually, the decrypted results of the one gate providing the inputs for the next gate. The first device 605 may use techniques to efficiently find the appropriate output. Thus the first device can learn the result.

In step 614, the first device 605 can then send the plaintext output to the second device 615. For example, with reference to FIG. 5, the output may indicate that a biometric template from the first device 505 matches a biometric measurement from the second device 515. The first device 605 may be prevented from modifying the plaintext output before sending it to the second device 615. The second device 615 may have a method for verifying the result from the first device 605.

VII. Computer System

Figure 7:
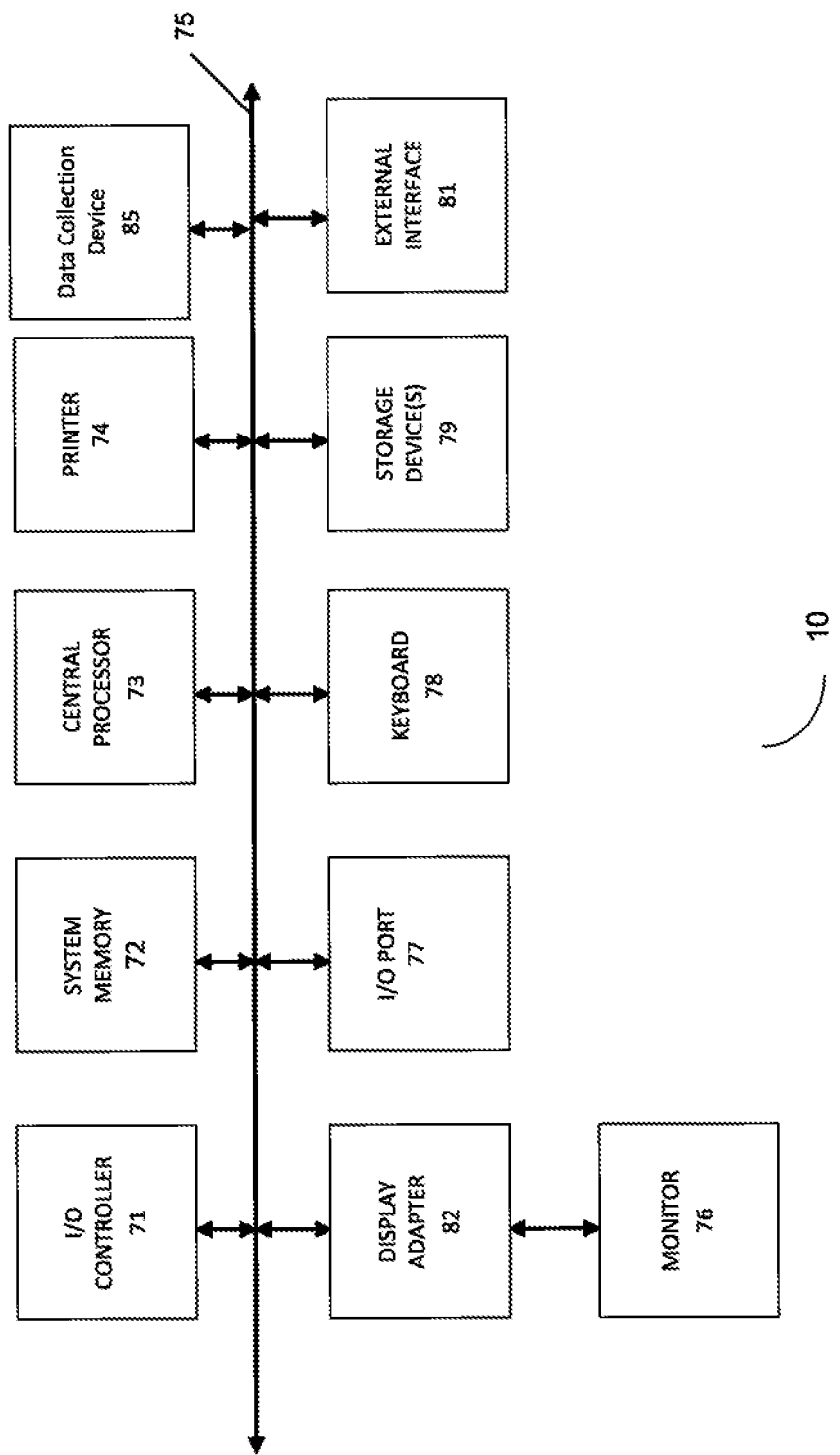
FIG. 7 shows a computer system according to some embodiments.

Any of the computer systems mentioned herein may utilize any suitable number of subsystems. Examples of such subsystems are shown in FIG. 7 in computer system 10. In some embodiments, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. The data collection device 85 may also be a biometric capture device, such as a fingerprint scanner or iris reader. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method of authenticating a first device of a user to a second device, the method comprising performing, by the second device:
receiving a public key and an encrypted biometric template from the first device;
obtaining, using one or more sensors of the second device, a biometric measurement from the user;
computing an encrypted similarity metric of the encrypted biometric template and the biometric measurement using homomorphic encryption with the public key, the encrypted similarity metric corresponding to a similarity metric encrypted with the public key;
sending a first message to the first device, the first message including the encrypted similarity metric;
receiving a response message from the first device, the response message indicating (1) whether a decrypted similarity metric exceeds a threshold, the decrypted similarity metric generated by decrypting the encrypted similarity metric; and
providing access to a resource when the decrypted similarity metric exceeds the threshold.

2. The method of claim 1, further comprising:
computing an encrypted code using the public key and the encrypted similarity metric within an authentication function, wherein the first message also includes the encrypted code, wherein the response message also indicates (2) whether a decrypted code matches a test code, the decrypted code generated by decrypting the encrypted code and the test code generated using the decrypted similarity metric and the authentication function, and wherein providing access to the resource further comprises providing access to the resource when the decrypted code matches the test code.

3. The method of claim 2, wherein the response message comprises the decrypted similarity metric and the decrypted code, thereby having the response message indicate (1) and (2).

4. The method of claim 3, the method further comprising:
generating the test code;
determining whether the test code matches the decrypted code; and
comparing the decrypted similarity metric to the threshold.

5. The method of claim 3, wherein the decrypted similarity metric is masked, the method further comprising
receiving one or more encrypted masks from the first device; and
masking the encrypted similarity metric with the encrypted masks.

6. The method of claim 5, wherein the response message comprises the decrypted similarity metric and a threshold proof, and wherein determining whether the decrypted similarity metric exceeds the threshold comprises:
evaluating the threshold proof.

7. The method of claim 2, wherein computing the encrypted similarity metric further comprises:
sampling one or more random values; and
masking the encrypted similarity metric using the one or more random values.

8. The method of claim 7, wherein the response message comprises an output of a garbled circuit, the method further comprising:
generating a garbled circuit, wherein the garbled circuit is configured to:
compute a test code by applying the authentication function to a decrypted similarity metric;
compare a decrypted code to the test code to verify a match, the decrypted code generated by decrypting the encrypted code;
determine whether the decrypted similarity metric exceeds a threshold; and
return an indicator that the decrypted similarity metric exceeds the threshold and the decrypted code matches the test code; and
sending the garbled circuit to the first device.

9. The method of claim 1, wherein the similarity metric is an inner product.

10. A method of authenticating a first device of a user to a second device, the method comprising performing, by the first device:
generating a public key and an encrypted biometric template;
sending the public key and the encrypted biometric template to the second device;
receiving a first message from the second device, the first message including an encrypted similarity metric, the encrypted similarity metric computed with the encrypted biometric template and a biometric measurement of the user using homomorphic encryption with the public key, the encrypted similarity metric corresponding to a similarity metric encrypted with the public key, the biometric measurement obtained by the second device;
decrypting the encrypted similarity metric to obtain a decrypted similarity metric; and
sending a response message to the second device, the response message indicating (1) whether the decrypted similarity metric exceeds a threshold.

11. The method of claim 10, wherein the first message also includes an encrypted code, the encrypted code computed using the public key and the encrypted similarity metric within an authentication function, the method further comprising decrypting the encrypted code to obtain a decrypted code, and wherein the response message also indicates (2) whether the decrypted code matches a test code, the test code generated using the decrypted similarity metric and the authentication function.

12. The method of claim 11, wherein the response message comprises the decrypted similarity metric and the decrypted code.

13. The method of claim 12, the method further comprising:
generating one or more random values;
encrypting the one or more random values with the public key to generate one or more encrypted masks;
sending the one or more encrypted masks to the second device; and
receiving the encrypted similarity metric, the encrypted similarity metric masked by the one or more encrypted masks.

14. The method of claim 13, wherein the response message comprises a threshold proof, and the decrypted similarity metric is masked, the decrypted similarity metric generated by decrypting the encrypted similarity metric, and wherein the method further comprises:
unmasking the decrypted similarity metric; and
generating the threshold proof.

15. The method of claim 11, wherein the encrypted similarity metric is masked by one or more random values, and wherein the one or more random values are generated by the second device.

16. The method of claim 15, wherein the response message comprises an output of a garbled circuit, the method further comprising:
receiving a garbled circuit from the second device; and
using the garbled circuit to:
compute a test code by applying the authentication function to a decrypted similarity metric;
compare a decrypted code to the test code to verify a match, the decrypted code generated by decrypting the encrypted code;
determine whether the decrypted similarity metric exceeds a threshold; and
return an indicator that the decrypted similarity metric exceeds the threshold and the decrypted code matches the test code.

17. A system comprising:
one or more sensors;
one or more processors; and
a computer readable medium storing a plurality of instructions for controlling the one or more processors to perform a method comprising:
receiving a public key and an encrypted biometric template from a first device;
obtaining, using the one or more sensors, a biometric measurement of a user;
computing an encrypted similarity metric of the encrypted biometric template and the biometric measurement using homomorphic encryption with the public key, the encrypted similarity metric corresponding to a similarity metric encrypted with the public key;
sending a first message to the first device, the first message including the encrypted similarity metric;
receiving a response message from the first device, the response message indicating (1) whether a decrypted similarity metric exceeds a threshold, the decrypted similarity metric generated by decrypting the encrypted similarity metric; and
providing access to a resource when the decrypted similarity metric exceeds the threshold.

18. The system of claim 17, wherein the method further comprises:
computing an encrypted code using the public key and the encrypted similarity metric within an authentication function, wherein the first message also includes the encrypted code, wherein the response message also indicates (2) whether a decrypted code matches a test code, the decrypted code generated by decrypting the encrypted code and the test code generated using the decrypted similarity metric and the authentication function, and wherein providing access to the resource further comprises providing access to the resource when the decrypted code matches the test code.

19. The system of claim 18, wherein the response message comprises the decrypted similarity metric and the decrypted code, thereby having the response message indicate (1) and (2).

20. The system of claim 19, wherein the method further comprises:
generating the test code;
determining whether the test code matches the decrypted code; and
comparing the decrypted similarity metric to the threshold.

* * * * *